(12) United States Patent
Yusa et al.

(10) Patent No.: US 7,736,558 B2
(45) Date of Patent: Jun. 15, 2010

(54) IMPRINT MANUFACTURE METHOD

(75) Inventors: Atsushi Yusa, Ibaraki (JP); Toshinori Sugiyama, Ibaraki (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 1094 days.

(21) Appl. No.: 10/751,974

(22) Filed: Jan. 7, 2004

(65) Prior Publication Data

US 2004/0211755 A1    Oct. 28, 2004

(30) Foreign Application Priority Data

Jan. 7, 2003    (JP)    ............... 2003-001171

(51) Int. Cl.
B29C 43/56    (2006.01)
B29B 13/00    (2006.01)

(52) U.S. Cl. ................ 264/85; 264/2.7; 264/322; 528/480

(58) Field of Classification Search .......... 264/83, 264/85, 572, 1.1, 1.33, 2.7, 319, 320, 322; 528/480, 481, 482, 483; 425/810
See application file for complete search history.

(56) References Cited

U.S. PATENT DOCUMENTS 4,990,595 A    2/1991    Traechkner et al.
5,766,637 A    6/1998    Shine et al.
5,772,905 A *  6/1998    Chou ........................ 216/44
6,676,867 B2 * 1/2004    Tsuchiya et al. ............. 264/83
6,814,898 B1 * 11/2004   Deeman et al. ............. 264/1.33
6,977,108 B2   12/2005   Hieda et al.

FOREIGN PATENT DOCUMENTS

| JP | 2-105819 A | 4/1990 |
| JP | 2000-511110 A | 8/2000 |
| JP | 2001-250217 A | 9/2001 |
| JP | 2002-184718 A | 6/2002 |
| JP | 2002-270540 A | 9/2002 |
| JP | 2002-279616 A | 9/2002 |
| JP | 2002-320929 A | 11/2002 |
| JP | 2002-324777 A | 11/2002 |

* cited by examiner

*Primary Examiner*—Mathieu D. Vargot
(74) *Attorney, Agent, or Firm*—Birch, Stewart, Kolasch & Birch, LLP

(57) ABSTRACT

Provided is an imprint method that includes the steps of softening resist in an object to be processed, by using compressed gas or supercritical fluid, the object including a substrate and the resist applied onto the substrate, and transferring a predetermined pattern onto the resist by pressing a mold that forms the predetermined pattern against the resist in the object.

6 Claims, 9 Drawing Sheets

PART A

ENLARGED VIEW OF PART A

ENLARGED VIEW OF PART A

PRIOR ART

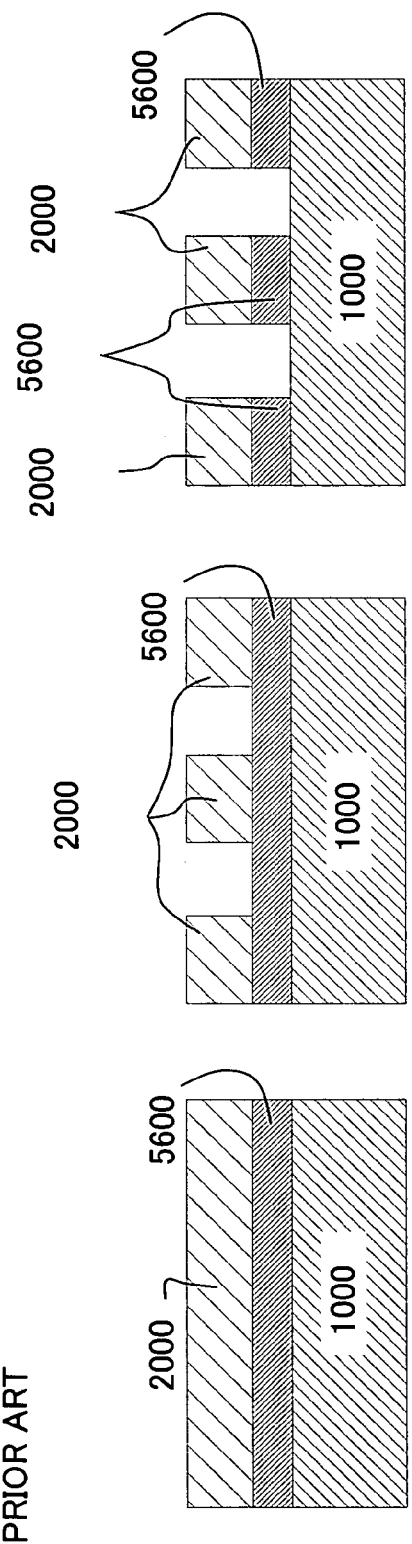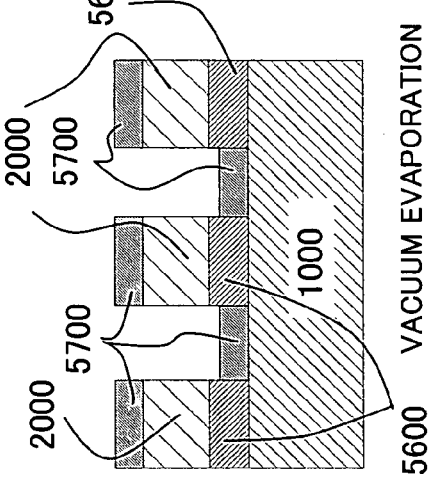

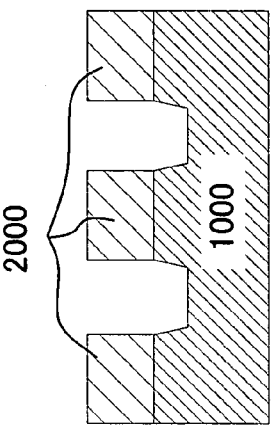
FIG. 11A
PRIOR ART
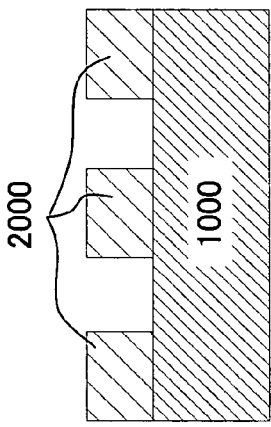
FIG. 11B
ELECTRON BEAM EXPOSURE, DEVELOPMENT
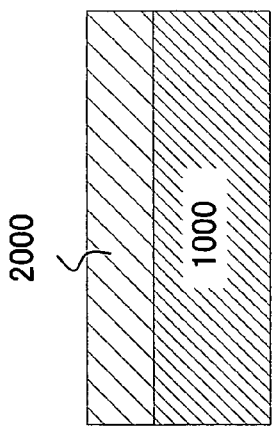
FIG. 11C
RIE
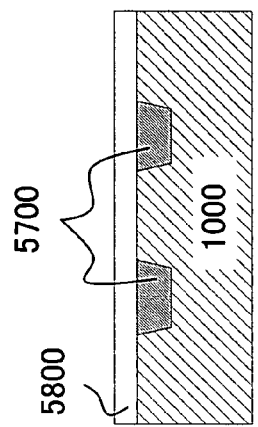
FIG. 11D
VACUUM EVAPORATION OF MAGNETIC MATERIAL
FIG. 11E
LIFT-OFF
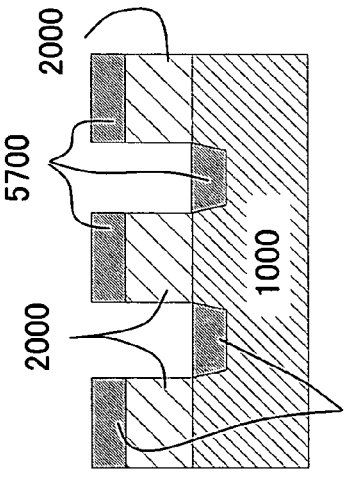
FIG. 11F
FORMATION OF SURFACE LUBRICATING LAYER

US 7,736,558 B2

IMPRINT MANUFACTURE METHOD

This application claims the right of priority under 35 U.S.C. §119 based on Japanese Patent Application No. 2003-1171, filed on Jan. 7, 2003, which is hereby incorporated by reference herein in its entirety as if fully set forth herein.

BACKGROUND OF THE INVENTION

The present invention relates to an imprint manufacture method and apparatus, a magnetic recording medium, and its manufacture apparatus.

The fine patterning technology for semiconductor manufacture has developed remarkably. The currently required and available critical dimension processing accuracy is 100 nm or smaller. Fine patterning technologies onto resist on a silicon wafer have used photolithography, direct imaging using an electron beam, and the like. Photolithography has improved the resolution with a shortened wavelength of a light source, but the exposure apparatuses are very expensive and transferring a pattern of 100 nm or smaller is difficult. On the other hand, the direct imaging using an electron beam has superior resolution but poor mass-productivity.

The nanoimprint lithography ("NIL") has been proposed (see U.S. Pat. No. 5,772,905) as a solution for the problem of poor mass-production technology of fine patterned devices. The NIL presses a mold having a nano-scale fine structure against the resist on a silicon wafer, and transfers the fine pattern onto the resist.

A description will be given of a NIL process with reference to FIGS. 9A-9E. A mold 3 uses, for example, a silicon thermal-oxide film patterned with electron-beam direct imaging, etc. First, as shown in FIG. 9A, a thin film 5 is formed as a resist with poly (methyl methacrylate) ("PMMA") as thermoplastic resin etc. on a silicon wafer 4. Next, as shown in FIG. 9B, the mold 3 held by a mold support 20 is pressed against the resist 5, and a fine pattern on the mold 3 is transferred onto the resist 5. The resist 5 is subject to compressive transferring while heated above the glass transition temperature (Tg) and softened. After the transfer completes, it is cooled and hardened, and the mold 3 is peeled off from the resist 5. Next, as shown in FIG. 9C, oxygen etching 21, etc. removes the remaining film to expose a silicon surface, as shown in FIG. 9D. As shown in FIG. 9E, after etching removes the resist, it is used as a single silicon device.

This manufacture method can transfer a pattern of 10 nm or smaller and has attracted attentions as the next generation for fine processing, only if the mold is available through time-consuming processing, fine patterns can be mass-produced using a more cost-efficient apparatus than a conventional processing machine.

In order to soften the resist and improve the transfer rate, some imprint methods have been proposed including one that uses supercritical fluid (see Japanese Patent Application Publication No. 2002-270540) and one that transfers a pattern under low pressure at room temperature (see Japanese Patent Application Publication No. 2002-184718).

Magnetic recording media called patterned media have been proposed recently (see Japanese Patent No. 1,888,363). Japanese Patent No. 1,888,363 discloses a base structure of the patterned media that arranges ferromagnetic particulates along a track at regular intervals, and records every bit on each ferromagnetic particulate. An application of the patterned media has been also proposed (see, for example, Japanese Patent Application Publication No. 2001-110050). A description will be given of the manufacture flows with reference to FIGS. 10A-10F and FIGS. 11A-11F.

First, as shown in FIG. 10A, a sputtering process arranges an amorphous carbon matrix thin film 5600 between a substrate 1000 and a resist 2000. Then, as shown in FIG. 10B, the electron-beam images the resist 2000, and a reactive ion etching ("RIE") process using fluoro-carbons and the resist as a mask, patterns amorphous carbon matrix thin film 5600, as shown in FIG. 10C. As shown in FIG. 10D, a magnetic layer 5700 is made by a sputtering process, and subjected to a lift-off process that dissolves and removes the resist mask 2000, as shown in FIG. 10E. As shown in FIG. 10F, a sputtering process forms a lubricating layer 5800 as an amorphous carbon layer, as shown in FIG. 10F.

A description will now be given of the manufacturing process disclosed in Japanese Patent Application Publication No. 2001-110050 with reference to FIGS. 11A-11F. First, resist 2000 is formed on a glass substrate 1000, as shown in FIG. 11A. As shown in FIG. 11B, electron-beam exposure and development follows. RIE then forms the mask pattern 2000 as shown in FIG. 11C. As shown in FIG. 11D, the magnetic thin film 5700 is made by a sputtering process, followed by the lift-off as shown in FIG. 11E. The surface lubricating layer 5800 is formed to form a patterned media, as shown in FIG. 11F.

However, the manufacture method disclosed in U.S. Pat. No. 5,772,905 needs to heat the resist above Tg and press at a high pressure. For example, the experiment conducted by inventors of U.S. Pat. No. 5,772,905 heated the resist with Tg of 105° C., up to 200° C. or higher, and applied a pressure of 13 MPa. An example report states that the applied pressure of 87 MPa at 170° C. is required to transfer a convex pattern with a critical dimension of 2 μm and a height of 340 nm onto PMMA resist. These conventional methods require an application of high pressure, and disadvantageously destroy the mold and the pattern on it.

A high strength diamond or SiC mold has been proposed as one solution for the above problem. However, the manufacture of such molds becomes disadvantageously expensive.

The conventional NIL method has had difficulties in alignment between a mold and a silicon wafer since the mold does not transmit light. Therefore, this method has been inapplicable for semiconductor manufacture processing due to poor pattern alignment when forming multiple layers. A mold made of a transparent material, such as quartz, would be easily destroyed and be unfeasible.

Conventional semiconductor manufacture processing also leaves fine defects, mainly in organic material(s) on minutely patterned resist, requiring cleansing of the resist surface. Use of an organic solvent, such as a rinse, for cleansing fluid in this cleansing step would disadvantageously destroy a pattern on the resist due to the surface tension at the interface between the gas and liquid phases. The above problem has become serious as the pattern becomes finer and the aspect ratio becomes higher.

Also disadvantageous is a high temperature of a wafer substrate at the time of pressing. This weakens the adhesion between the resist and the substrate, cause partial stripping of a polymer membrane after pressing, and cause difficulties in forming a large-scale fine pattern. Cooling of the substrate temperature below Tg of the resist when peeling off the resist from the mold would disadvantageously lower the throughput.

Japanese Patent Application Publication No. 2002-270540 presses a mold against a resist that contains softener for transferring in a chamber that receives supercritical fluid. This method hardens the resist by extracting the softener in the resist with supercritical fluid. Maintenance of pressing is required until the extraction is completed. In order to extract the softener, the supercritical fluid should infiltrate through a minute aperture corresponding to the resist's thickness between the mold and substrate. Therefore, because it takes time to infiltrate into the resist, a large-scale pattern was hard to be mass-produced.

Japanese Patent Application Publication No. 2002-184718 selects chemical amplification resist, holds acid chemicals on convex portions on the mold, and provides a heat treatment to the substrate after pressing it, thereby causing the resist to exhibit an insolubilization or solubilization reaction only at acid filtrated portions. Thereafter, the development of the resist forms convex and concave patterns corresponding to the mold pattern. However, it is anticipated that this method has difficulty in selectively infiltrating acid only into the convex portions on large-scale mold patterns. In particular, it is difficult to infiltrate chemicals only into the convex pattern portions and to accurately form fine patterns, such as those below 200 nm.

A method disclosed in Japanese Patent Application Publication No. 2001-110050 can increase the capacity of a magnetic disc, but the electron-beam imaging causes low throughput. A mass-productive imprinting manufacture method has been proposed (for example, in Japanese Patent Application Publication No. 2003-157520) which provides a process for manufacturing patterned media, and efficiently equalizes press pressure by arranging a buffer layer that has an area corresponding to a recording area and narrower than a substrate and a mold area, between the upper and lower pressing surfaces and one of the mold pattern and the substrate. An application of press pressure above 500 bars would form a pattern at a temperature below the glass transition temperature of the resist, and achieve high throughput. This method, however, has a problem because high press pressure damages the mold and the substrate. Therefore, one mold cannot manufacture many patterned media.

BRIEF SUMMARY OF THE INVENTION

Accordingly, in order to solve the above disadvantages, it is an exemplified object of the present invention to provide an imprint method and apparatus, which lengthen the mold's life. Another exemplary object is to provide an imprint method and apparatus, which provide high-quality processing to an object.

It is still another exemplary object of the present invention to provide an imprint method, a manufacture method and apparatus of a magnetic recording medium, which achieve a low-temperature process below the glass transition temperature of the resist, and form a large-scale fine pattern onto a polymer membrane with high throughput even under low pressure. Another exemplary object is to provide an imprint method, a manufacture method and apparatus of a magnetic recording medium, which mass-produce a minutely patterned magnetic recording medium.

An imprint method of one aspect according to the present invention includes the steps of softening the resist in an object to be processed, by using compressed gas or supercritical fluid, the object including a substrate and the resist applied onto the substrate, and transferring a predetermined pattern onto the resist by pressing a mold that forms the predetermined pattern against the resist in the object. This imprint method can reduce the applied pressure during transferring and lengthen the mold's life because of the compressed gas or supercritical fluid softening step. The imprint method serves as a manufacture method of the object to be processed, and covers intermediate and final products of the object (such as a chip and LCD).

The method preferably further includes the step of cleansing the resist with supercritical fluid after the transferring step, thereby removing defects without posttreatment cleansing, and providing high-quality process to the object. Since supercritical $CO_2$ has a surface tension of zero and solvency powers similar to that of n-hexane, the resist can be cleansed and dried without changing and damaging a pattern. In this case, the cleansing step preferably maintains a pressure of the supercritical fluid between 7 MPa and 10 MPa.

The mold may be made of a transparent material, and the imprint method further includes the step of aligning the object with the mold. Thereby, an optical sensor, etc. can provide a proper alignment through the mold for high-quality processing to the object. The compressed gas is, for example, compressed $CO_2$, and the supercritical fluid is, for example, supercritical $CO_2$.

An imprint method of another aspect according to the present invention includes the steps of softening resist in an object to be processed, the object including a substrate, and the resist applied onto the substrate, and transferring a predetermined pattern onto the resist by pressing a mold that forms the predetermined pattern with applied pressure of 5 MPa or smaller against the resist in the object. This imprint method reduces the applied pressure down to 5 MPa, lengthening the mold's life.

The effective applied pressure of the present invention is defined as mechanically applied pressure (A) to a transferred surface-pressure (B) by which the supercritical fluid or the like pushes back the transferred surface. The supercritical fluid and compressed $CO_2$ have low viscosity and strength insufficient to damage a contact material. On the other hand, a high-strength metallic member, such as a mold and a stamper, easily damages a contact material.

The above equation defines the pressure directly applied to the resist by the metallic member. Although the damage caused by (B) is not negligible, the pressure damage is sufficiently small in the present invention even when considered.

An imprint method of another aspect according to the present invention includes the steps of softening resist in an object to be processed, through a compressive infiltration of compressed gas or supercritical fluid, the object including a substrate and the resist applied onto the substrate, transferring a predetermined pattern onto the resist by pressing a mold that forms the predetermined pattern against the resist in the object, and decompressing the compressed gas or the supercritical fluid after the transferring step, and hardening the resist. More preferably, the compressed gas is compressed $CO_2$ or the supercritical fluid is supercritical $CO_2$.

Compressed $CO_2$ or supercritical $CO_2$ effectively infiltrates into the resist (or thermoplastic polymer), enlarges intermolecular distances in the polymer, and reduces the glass transition temperature and surface tension. Therefore, it is easy to soften the resist without causing temperature rises to the mold, substrate and resist. In particular, compressed $CO_2$ easily infiltrates into and softens straight-chain polymer, and thus the inventive imprint method more preferably uses PMMA (poly (methyl methacrylate)), having the glass transition temperature of about 100° C., for the resist. According to the present invention, the plasticizer effect remarkably improves when the entrainer (or assistant), such as alcohol, blended with the supercritical $CO_2$ contacts the resist.

The inventive imprint method can form a mold pattern on the resist through pressing, abruptly vaporize $CO_2$ that has been infiltrated in the resist by decompressing the internal pressure in the chamber and press pressure, and harden the resist instantly. The sudden decompression results in forming micro bubbles inside the resist when the resist has a thickness 50 μm or larger, since the resist hardens before the vaporized $CO_2$ is completely exhausted. This problem is evitable when the resist is set to a thickness of 50 μm or smaller. More preferable is a resist thickness below 10 μm, with the most preferable being below 1 μm.

The step of softening the resist may compressively infiltrate the compressed gas or the supercritical fluid and the low-molecular water repellency agent or release agent dissolved in the compressed gas or the supercritical fluid into the resist. Supercritical $CO_2$ has solvent characteristics similar to those of n-hexane, and can dissolve certain low-molecular polymer. Structures such as a dissolved organic material, with a water repellant function in supercritical $CO_2$ and infiltrating the resultant into the resist can lower the glass transition temperature of the resist and modify its surface to be repellant. Usually, a repellant mold surface enlarges the surface tension and prevents the resist (molten resin) from sufficiently transferring a fine mold pattern (or a fine structure). However, until the resist is decompressed, this structure enables the repellent function to conceal while the water repellency agent is dissolved in the supercritical fluid, and maintains a low surface tension. Upon decompression after the press transfer, the resist hardens and precipitates the water repellency agent, whereby its surface reveals repellency. Thereby, the adhesion between the resist and the mold lowers, allowing for easy separation of the two. On the other hand, the resist and the substrate are prevented from being separated from each other. Use of supercritical $CO_2$ having a surface tension of zero and strong infiltration power as a solvent would uniformly arrange a functional agent on the resist surface more quickly.

The repellency agent can have a molecular weight between 100 and 10000, and contain silicon oil or fluorine (for example, low-molecular PTFE (polytetrafluoroethylene). Solubility improves with the assistant called entrainer, such as ethanol and acetone. For a uniform concentration of the entrainer, repellency agent and supercritical fluid, a mixed tank with an agitator is preferable. This structure sets the molecular weight between 100 and 10000. Molecular weights larger than the upper limit cause difficulty in maintaining solubility, while molecular weights smaller than the lower limit easily desorbs the water repellency agent from the resist.

The method may further include the step of maintaining the temperature of the mold at a constant temperature below the glass-transition temperature of the resist. In general, the throughput lowers as the temperature fluctuates, but this structure maintains the temperature and thus does not lower the throughput. The pressure of $CO_2$ can control the glass transition temperature and surface tension of the resist. Thus, it is unnecessary to make the temperature of the mold, etc. higher than the glass temperature of the resist.

The step of softening the resist can compressively infiltrate into the resist the compressed gas or the supercritical fluid at a pressure of 7 MPa or larger and at a temperature of 31° C. or higher.

The step of softening the resist can set an aperture between the mold and the resist to 100 μm to 1 mm. The smaller the aperture (or the space) is, the shorter the infiltration time of $CO_2$ becomes and the easier a design of the pressure resistant structure becomes. However, the excessively small space results in contacts between the resist and the mold depending upon the mechanical precision of the apparatus. Therefore, a space between 100 μm to about 1 mm is preferable for compatibility between the infiltration time and the contact.

To compressively infiltrate the compressed gas or supercritical fluid into the resist, a pressure of 7 MPa or larger, at a temperature of 31° C. or higher is preferable for the softening step of the resist. More preferably, the compressed gas or the supercritical fluid have pressures set between 10 MPa and 35 MPa, and a temperature between 40° C. and 50° C. A pressure and temperature higher than the upper limits cause difficulty in sealing at the valves, etc., and increase costs. Pressures and temperatures lower than the lower limit reduce the plasticization effects.

When the transferring step presses the mold at a pressure below 10 MPa added to the pressure of the compressed gas or supercritical fluid, the compressed $CO_2$ or the supercritical $CO_2$ sufficiently softens the resist and brings the surface tension close to zero. Thereby fine-pattern transfers are achieved under low-pressure press.

An imprinting apparatus of one aspect according to the present invention includes a softening part that introduces compressed gas or supercritical fluid for softening resist in an object to be processed, the object including a substrate and the resist applied onto the substrate, and a compression part that presses a mold to form a predetermined pattern against the resist in the object and transfers a predetermined pattern onto the resist. It may further include a cleansing part that cleanses the resist. This imprinting apparatus may exhibit similar operations to those of the above imprint method.

When it includes a hardening part for hardening the resist by decompressing the compressed gas or supercritical fluid after transferring, the decompression of the internal pressure in the chamber and press pressure suddenly vaporizes $CO_2$ that infiltrate the resist and hardens the resist instantly after the press forms the mold pattern on the resist.

An imprinting apparatus of another aspect according to the present invention includes a supply part that introduces supercritical fluid to the resist in an object to be processed which includes a substrate and the resist applied to the substrate, and a compression mechanism that transfers a predetermined pattern onto the resist by pressing a mold that forms the predetermined pattern against the resist in the object. The supply part may serve, for example, as the above softening part and/or the cleansing part. The mold may be made of a transparent material. Thereby, an optical sensor, etc. can provide an alignment through the mold between the mold and the object for high-quality processing of the object.

As discussed above, the compressed gas is, for example, compressed $CO_2$, and the supercritical fluid is, for example, supercritical $CO_2$.

A method of another aspect according to the present invention for manufacturing a magnetic recording medium utilizes an imprint method that includes the steps of softening resist in an object to be processed, through a compressive infiltration of compressed gas or supercritical fluid, the object including a substrate and the resist applied onto the substrate, transferring a predetermined pattern onto the resist by pressing a mold that forms the predetermined pattern against the resist in the object, and decompressing the compressed gas or the supercritical fluid after the transferring step, and hardening the resist.

According to this structure, compressed gas or supercritical fluid infiltrates into the resist (or thermoplastic polymer), enlarges intermolecular distances in the polymer, and reduces the glass transition temperature and surface tension. Therefore, it is easy to soften the resist without causing temperature rises in the mold, substrate and resist. In particular, compressed $CO_2$ easily infiltrates into and softens straight-chain polymer, and thus the inventive imprint method more preferably uses for the resist PMMA (poly (methyl methacrylate)) that has a glass transition temperature of about 100° C. According to the present invention, the plasticizer effect remarkably improves when the entrainer (or assistant), such as alcohol, blended with supercritical $CO_2$ contacts the resist. After the press forms the mold pattern on the resist, the decompression of the internal pressure in the chamber and press pressure suddenly vaporizes $CO_2$ that has been infiltrated in the resist and hardens the resist instantly.

A method of another aspect of the present invention for manufacturing a magnetic recording medium that has, in a diameter range of 5 cm or larger, a spiral rectangular groove with a groove width of 50 nm to 150 nm, a groove depth of 30 nm to 100 nm, and a track pitch of 100 nm to 200 nm utilizes an imprint method that includes the steps of softening resist in an object to be processed, through a compressive infiltration of compressed gas or supercritical fluid, the object including a substrate and the resist applied onto the substrate, transferring a predetermined pattern onto the resist by pressing a mold that forms the predetermined pattern against the resist in the object, and decompressing the compressed gas or the supercritical fluid after transferring, and hardening the resist.

This configuration can form a large-scale fine mold pattern, and manufacture a magnetic recording medium with precision.

An apparatus of another aspect of the present invention for manufacturing a magnetic recording medium includes an imprinting apparatus that includes a supply part that introduces supercritical fluid to the resist in an object to be processed which includes a substrate and the resist applied to the substrate, a compression mechanism that transfers a predetermined pattern onto the resist by pressing a mold that forms the predetermined pattern against the resist in the object, and a hardening part that decompresses the compressed gas or the supercritical fluid after transferring, and hardens the resist. This structure can obtain effects similar to the above magnetic recording medium manufacture method.

Other objects and further features of the present invention will become readily apparent from the following description of preferred embodiments with reference to accompanying drawings.

The present invention can provide an imprint method and apparatus, which lengthen the mold's life and/or provide high-quality processing to an object. The present invention can also provide an imprint method, a manufacture method and apparatus of a magnetic recording medium, which achieve a low-temperature process below the resist's glass transition temperature, and form a large-scale fine pattern onto a polymer membrane with high throughput even under low pressure. Moreover, the present invention can provide an imprint method, a manufacture method and apparatus of a magnetic recording medium for mass-producing minutely patterned magnetic recording medium.

BRIEF DESCRIPTION OF THE DRAWINGS

FIG. 10A-10F are is a flow for explaining a conventional method of manufacturing patterned media.

FIG. 11A-11F are is a flow for explaining a conventional method of manufacturing patterned media.

DETAILED DESCRIPTION OF THE PREFERRED EMBODIMENTS

A description will now be given of embodiments according to the present invention.

First Embodiment

Figure 1:
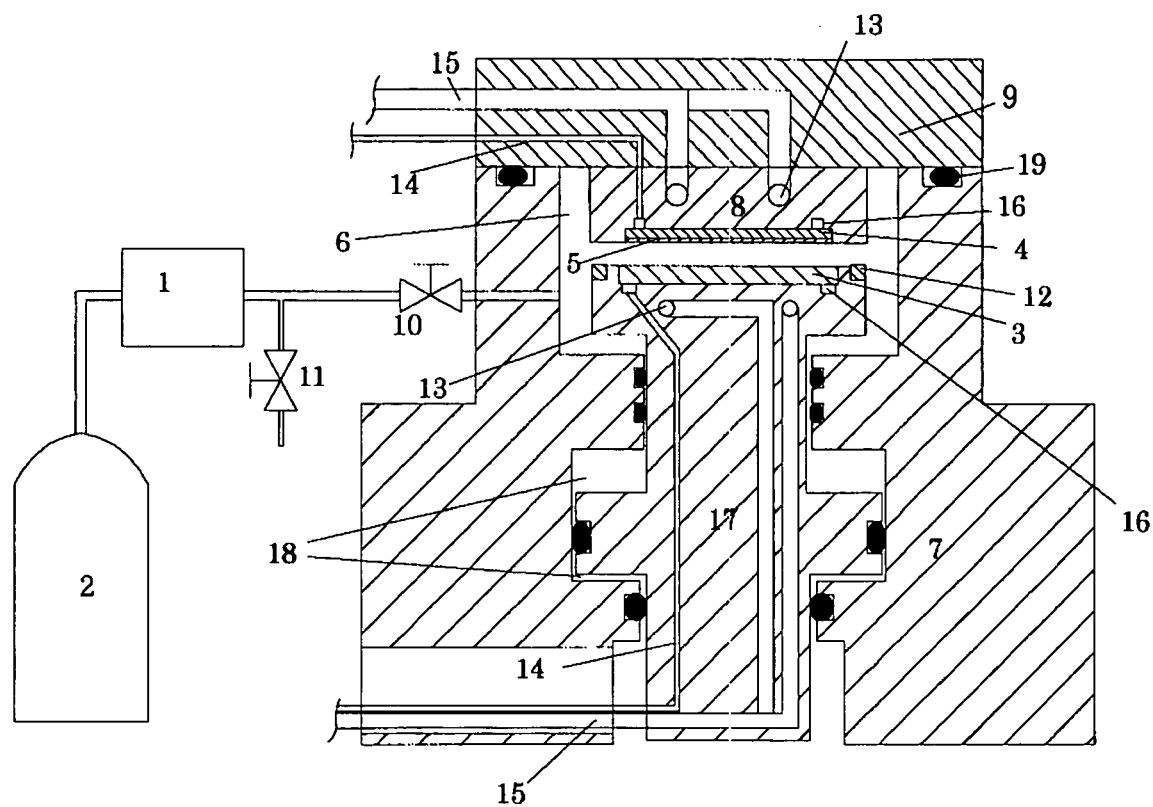
FIG. 1 is a schematic sectional view of a nanoimprinting apparatus before pressing of a first embodiment according to the present invention.

FIG. 1 shows an NIL apparatus for use with the first embodiment. This embodiment presses a mold 3 having fine convex and concave patterns against a polymer membrane 5 as resist on a substrate 4, such as silicon wafer and quartz glass, while bringing high-pressure $CO_2$ or supercritical $CO_2$ into contact with the polymer membrane 5, and thereby transfers the fine pattern onto the polymer membrane 5.

This embodiment fills a closed chamber 6 with supercritical $CO_2$ and uses an apparatus that presses in the chamber 6. $CO_2$ gas supplied to a supercritical fluid generator 1 from a $CO_2$ tank 2 enters a supercritical state and is then supplied to the outside by the opening and closing of a built-in electromagnetic valve. Supercritical $CO_2$ can have arbitrary pressure and temperature, but higher pressure would preferably increase infiltration into solid polymer and lower Tg, viscosity and surface tension. However, excessively high pressure would cause difficulties in closing and sealing, making the apparatus expensive. Therefore, pressure between 10 and 35 MPa is more preferable. This embodiment used supercritical $CO_2$ at 40° C. and 15 MPa.

The chamber 6 filled with supercritical $CO_2$ closes an upper block 9 and a lower body 7, and uses an O-ring 19 to seal them. The upper block 9 contains a substrate support plate 8 that holds the substrate 4 and the polymer membrane 5 layered on the substrate 4. A vacuum pump (not shown) vacuum-absorbs the substrate 4 onto a surface of the support 8 through a ring-shaped vacuum groove 16 and a connected vacuum vent 14.

Any material can be used for the substrate 4 and polymer membrane 5. This embodiment used a 2-mm thick silicon wafer for the substrate 4 and PMMA having a glass transition temperature of 100° C. for the polymer membrane 5. The polymer membrane had a thickness of 2 µm.

An annular temperature control circuit 13 is provided to the substrate support plate 8, and connected to a tube 15 and a temperature controller (not shown) for temperature control in a range of 30° C. to 145° C. using the temperature controller that utilizes wafer as a medium. A mold 3 held on a piston block 17 is also vacuum-absorbed, similar to the substrate 4, by exhaustion through the vacuum groove 16. The piston block 17, built in the lower body 7, moves up and down as oil (not shown) at an arbitrary pressure travels in and out of the cylinder 18. While hydraulically driven, the piston block 17 is compressed against the substrate support plate 8. This embodiment provides a positioning ring 12 to adjust the distance between the substrate 4 and the mold 3 when the piston block 17 moves up.

Figure 2:
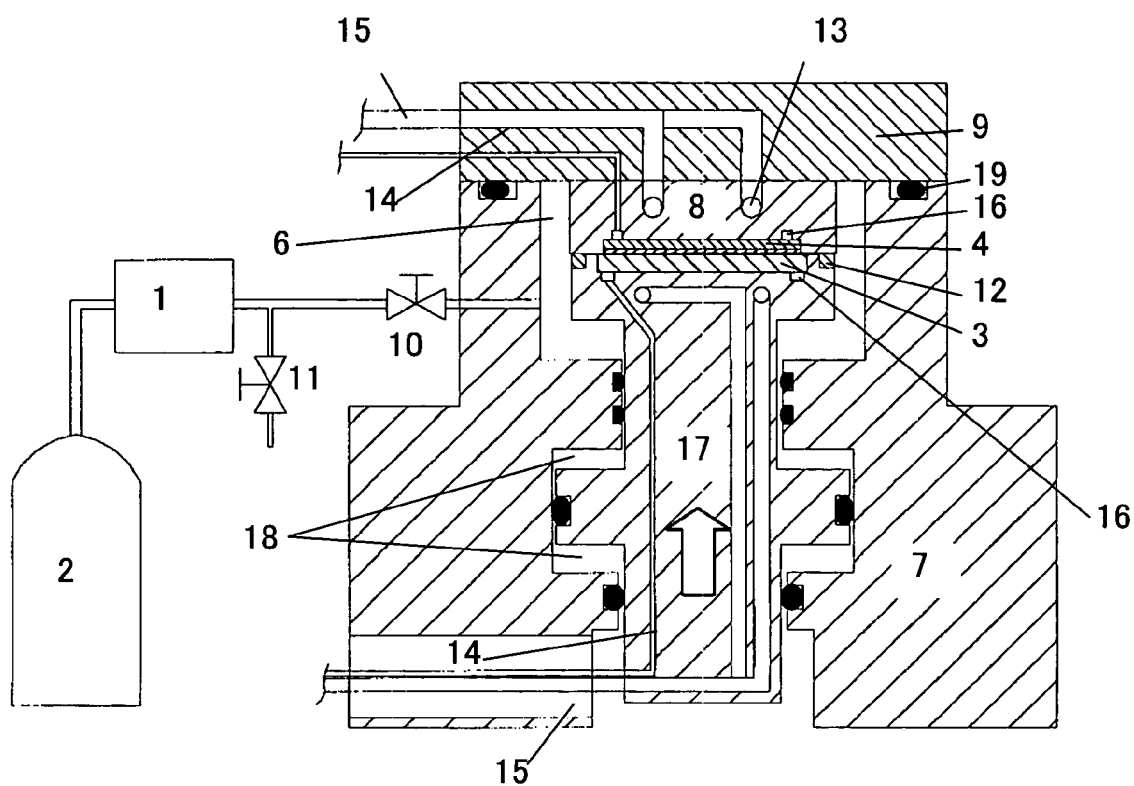
FIG. 2 is a schematic sectional view of the nanoimprinting apparatus after pressing shown in FIG. 1.

As shown in FIG. 2, when the piston block ascends, the distance between the substrate and the mold was 0.5 μm. In other words, when there is no polymer membrane on the substrate 4, the substrate 4 does not contact the mold 3.

This embodiment may use any material and processing method, etc. for the mold 3, but this embodiment used 5-mm thick quartz glass and formed a line and space with a critical dimension of 0.1 μm, a depth of 0.5 μm, and a pitch of 0.2 μm using electron-beam direct imaging. A fine pattern on the mold 3 was transferred as follows: The mold 3, made of a transparent material, enables an optical sensor to provide an alignment through the mold 3 between the mold 3 and an object to be processed which includes the substrate 4 and the resist 5. High-quality processing to the object after alignment and overlay is thus provided.

An electromagnetic valve 10 was opened when an electromagnetic valve 11 was closed, and the supercritical fluid generator 1 introduces supercritical $CO_2$ into the closed chamber 6. The piston block 17 moves up when the pressure in the chamber 6 was stabilized. Both the substrate support plate 8 and the piston block 17 were temperature-controlled to 140° C. During transferring, the oil pressure of the cylinder 18 was controlled so that the press pressure against the polymer membrane became 17 MPa. In other words, the pressure on the polymer membrane is 2 MPa, which is a subtraction from the pressure applied to the piston block by 15 MPa as the pressure of the supercritical fluid.

This embodiment impregnates $CO_2$ in a supercritical fluid state into the polymer and drastically lowers its Tg, viscosity and surface tension. Thus, polymer viscosity fluid may infiltrate into a nano-scale fine structure under an ultra-low pressure. The supercritical fluid itself and polymer have remarkably low hardness and seldom damage the mold.

After the transfer is completed, the temperature control circuit for controlling the substrate support plate 8 and piston block 17 decreases the temperature down to 80° C. Once the polymer membrane sufficiently hardens, the piston block 17 is moved down to peel off the mold 3 from the substrate 4.

The chamber's 6 inside is maintained in a supercritical state, and supercritical $CO_2$ is used to cleanse the surface of the polymer membrane. Since supercritical $CO_2$ has a surface tension of zero and solvency powers similar to that of n-hexane, the resist can be cleansed and dried without changing and damaging the pattern. Supercritical $CO_2$ and organic material dissolved in it, which are still in the chamber 6, are fed to the outside of the chamber through a pipe arrangement (not shown). After the supercritical fluid generator 1 stops supplying supercritical $CO_2$, the electromagnetic valves 10 and 11 are opened to release the atmosphere in the chamber 6 to the air.

The upper block 9 disconnects from the lower body 7, and the substrate 4 was taken out. SEM observations of a pattern section of the polymer membrane in this embodiment found an approximately accurate reproduction of the mold pattern.

According to the method of the instant embodiment, the mold 3 and its surface pattern did not deteriorate even after the same mold 3 experienced ten thousand transfers onto plural substrates 4.

Comparative Example

The same apparatus as in the embodiment is used under the same condition to transfer a pattern of the mold 3 onto the polymer membrane without introduction of supercritical $CO_2$ into the chamber 6. Since the press was conducted in air, the oil pressure of the cylinder 18 was controlled so that the surface pressure against the polymer membrane was 2 MPa. Transfer performance having only a depth of about 0.1 μm was obtained for a mold 3 having a depth of 0.5 μm. An approximately completely transfer of the groove depth of the mold 3 in air was conditioned on temperatures of 200° C. of the mold 3 and the substrate 4 and applied surface pressures to the polymer membrane 5 of 40 MPa. As a result of some repetitive transfers onto plural substrates 4 using the same mold 3 under these conditions, the mold 3 got damaged at its surface.

Second Embodiment

Figure 3:
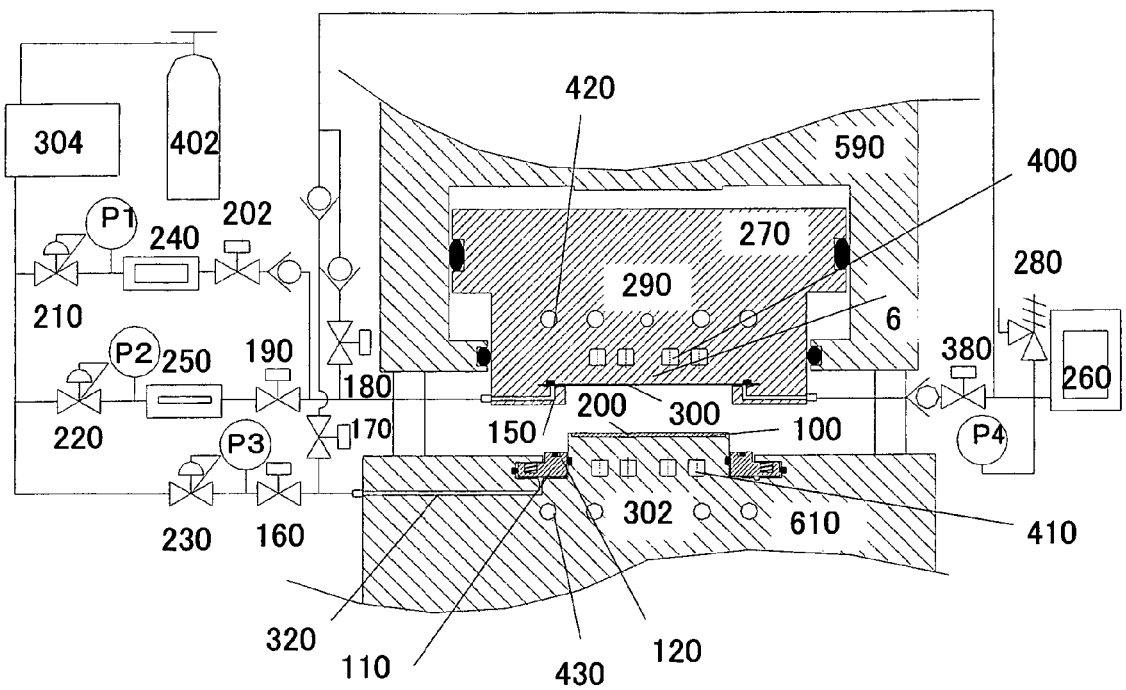
FIG. 3 is a schematic sectional view of a nanoimprinting apparatus before pressing of a second embodiment according to the present invention.

FIG. 3 shows a NIL apparatus for use with the second embodiment. This embodiment presses a mold 300 having fine convex and concave patterns against resist (polymer membrane) 200 on a substrate 100, such as silicon wafer and quartz glass, while bringing high-pressure $CO_2$ or supercritical $CO_2$ into contact with the resist 200, thereby transferring a fine pattern onto the polymer membrane.

For an easy design of a pressure container, the present invention prefers the use of compressed $CO_2$ or supercritical $CO_2$ for filling the pressure chamber. This embodiment forms the high-pressure chamber as an outer ring 110 outside a glass substrate 100 contacts a piston 270. High-pressure $CO_2$ introduced through a channel 320 moves up the outer ring 110. Even when the substrate 100 does not contact the mold 300, such as a stamper, an O-ring 120 contacts the piston 270 and maintains the high-pressure gas in the chamber.

A description will be given of the press mechanism of the instant embodiment. Feedback controlled by heaters 420 and 430 and thermocouples 290 and 302, built in an upper cylinder 590 and a lower plate 610, are designed to heat and lag the piston 270. These heaters 420 and 430 are used in heating up the plate 100 and the mold 300 above 150° C. For example, these heaters 420 and 430 are used when the thermoplastic polyimide etc. with glass transition temperature of 180° C. or higher are used for resist. However, temperature controlled water, controlled by a temperature controller (not shown), flowing through temperature control circuits 400 and 410, heats the resists 200, when the resist 200 uses PMMA etc. which have the glass transition temperature lower than 180° C. An upper cylinder 590 working hydraulically generates the maximum press pressure of 25 tons. The upper cylinder 590 in this embodiment is required for handling the pressure of the compressed $CO_2$ or supercritical $CO_2$, and to realize the press pressure of about 10 MPa in addition to the pressure of compressed $CO_2$ or supercritical $CO_2$. This embodiment uses a glass plate with an outer diameter of 3.5 inches (=8.89 cm) for the substrate 100 with the resist 200. The pressure is set to about 15 tons, which is necessary to prevent the high-pressure chamber from opening when maintaining a gas pressure of 20 MPa in the space inside the O-ring 120 of the outer ring 110 (or the high-pressure chamber).

Referring to FIG. 3, a description will be given of an introduction apparatus for the compressed $CO_2$ or supercritical $CO_2$ in the instant embodiment. A compressed $CO_2$/supercritical fluid generator 304, such as a booster pump, increases the pressure and temperature in a $CO_2$ tank 402. $CO_2$ has a controllable pressure between 1 and 35 MPa, and a controllable temperature between 25 and 55° C. Decompression valves 210, 220 and 230 control introduction pressures P1 to P3 to the pressing machine. Automatic valves 160, 190, 202 control introduction timings.

The device of the instant embodiment introduces high-pressure $CO_2$, stored in reserve tanks 240 and 250, and at pressures P1 and P2 into an aperture (space) between the mold 300 and the resist 200. A heater (not shown) is designed to maintain the pipe's temperature from the reserve tanks 240 and 250 to the pressing machine between 45 and 50° C. $CO_2$ is also introduced at a pressure P3 from the bottom of the outer ring 110. The instant embodiment set P1 to 5 MPa, P2 to 20 MPa, and P3 to 10 MPa.

Opening automatic valves 180 and 380 exhausts $CO_2$ from the high-pressure chamber into a recovery container 260, where it is stored. The pressure P4 in the recovery container is maintained at 1 MPa. A relief pressure valve 280 is designed to automatically exhaust extra $CO_2$.

A description will now be given of an imprint process of the instant embodiment. This embodiment used for the resist 200, poly (methyl methacrylate) (or PMMA) having a glass transition temperature of 100° C. The temperature control circuits 400 and 410 set the temperatures at 70° C. so that the mold 300 and the substrate 100 have the same temperature. Spin coat adjusts a film thickness of the resist 200 to 0.5 μm.

Figure 7:
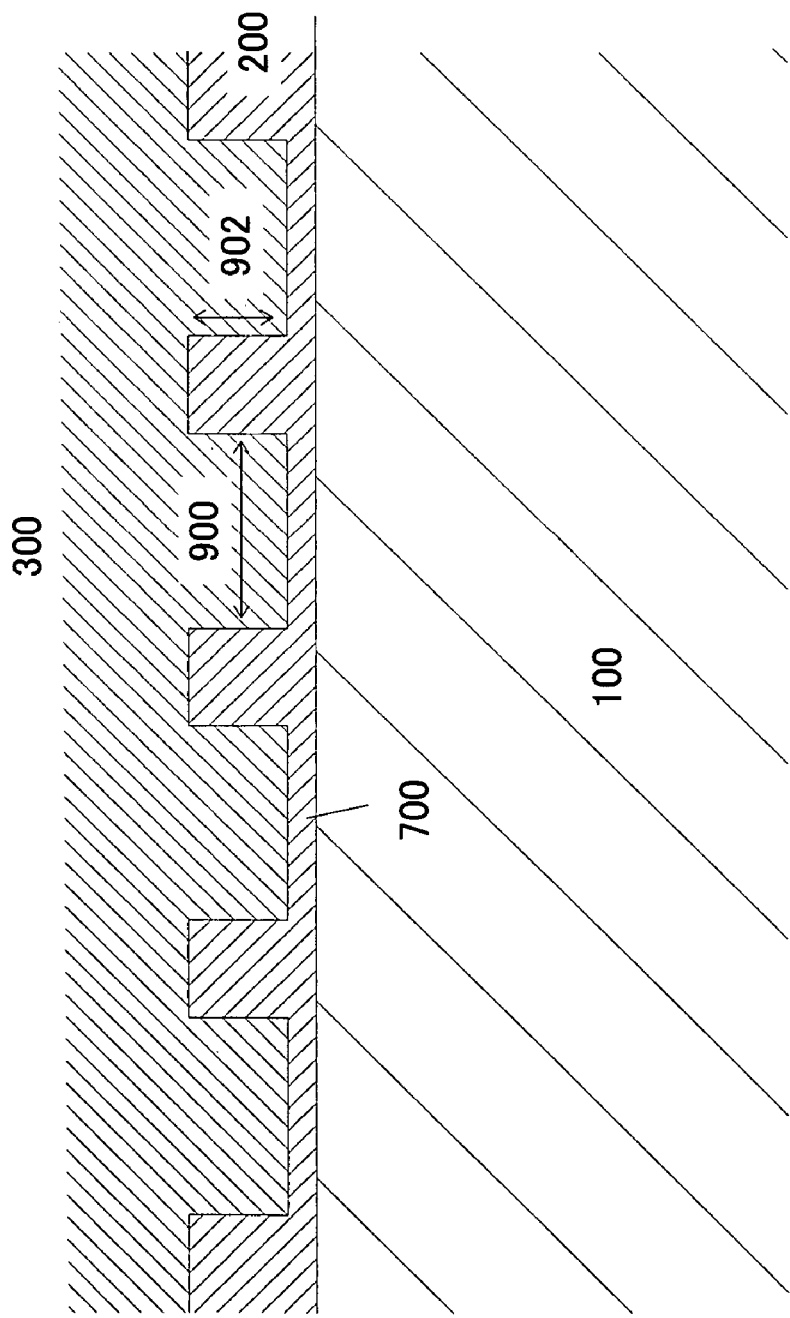
FIG. 7 is an enlarged sectional view for explaining a resist pattern on a substrate.

As shown in FIG. 7, the Ni stamper's 300 mold design has concave and convex shapes so that the resist 200 can have a groove width 900 of 100 nm and a groove depth 902 of 50 nm. The Ni stamper 300 was produced by spiral patterning the resist 200 onto a silicon wafer by an electron-beam imaging method followed by a Ni electrocasting process.

Figure 4:
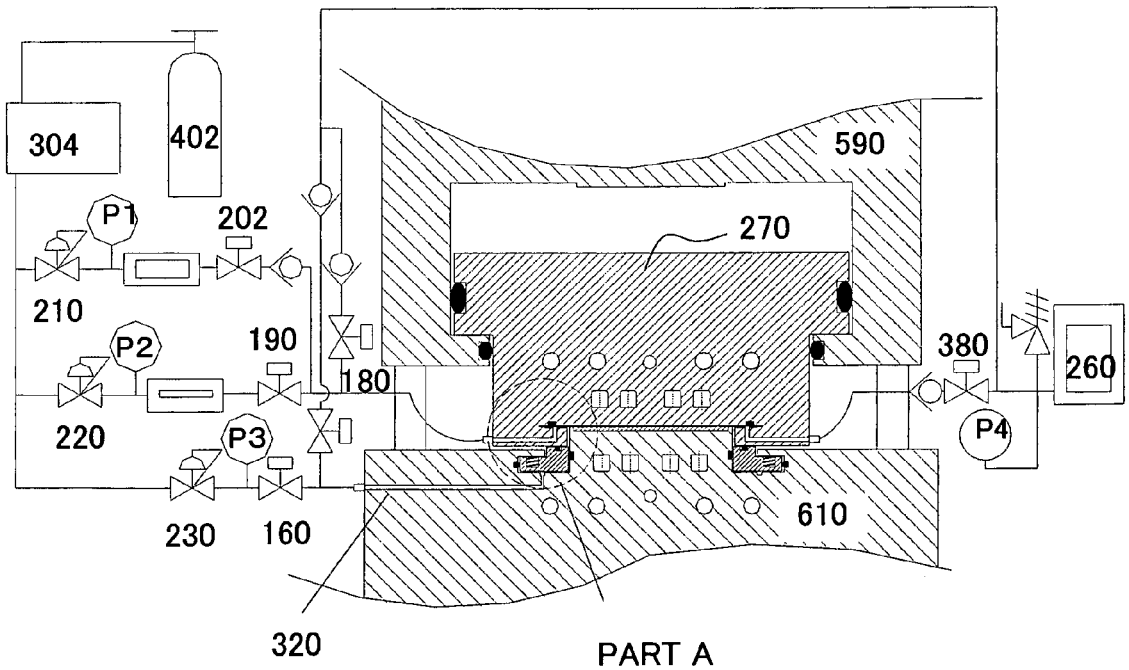
FIG. 4 is a schematic sectional view of the nanoimprinting apparatus after pressing shown in FIG. 3.
Figure 6:
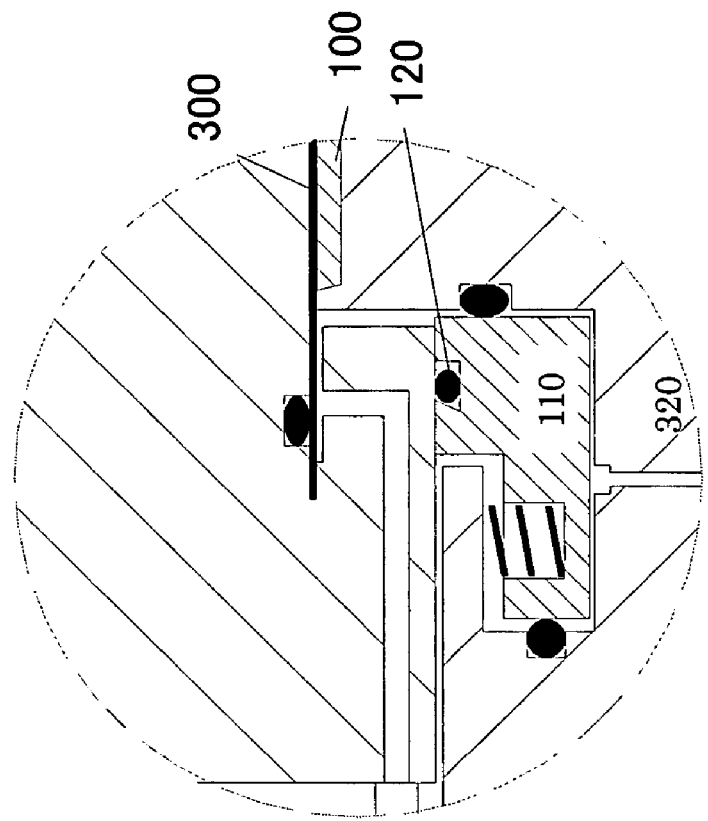
FIG. 6 is an enlarged view of part A in the nanoimprinting apparatus shown in FIG. 4, showing that a mold is pressed against resist.

After the NIL apparatus sets the above substrate 100 through a feeder (not shown), the piston 270 is moved down and press transfer was conducted, as shown in FIG. 4. A description will be given of the transfer step with reference to FIGS. 5 and 6 as enlarged views of part A in FIG. 4.

Figure 5:
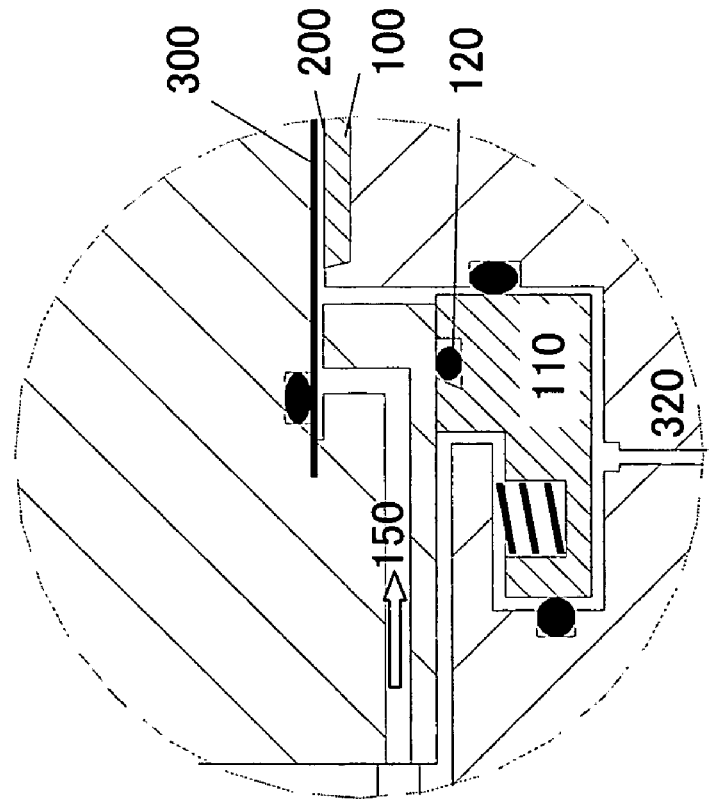
FIG. 5 is an enlarged view of part A in the nanoimprinting apparatus shown in FIG. 4, showing an introduction of $CO_2$.

As shown in FIG. 5, the press pressure is adjusted so that there is a 0.2 μm space between the resist 200 on the substrate 100 and the mold 300 as a Ni stamper. The valve 202 is then opened to introduce $CO_2$ into the space between the resist 200 and the stamper 300 through the channel 150 in the arrow's direction. Low-pressure $CO_2$ adjusted to 5 MPa is introduced because an abrupt introduction of high-pressure $CO_2$ would blow the mechanically unfixed substrate 100 in the chamber.

Valves 190 and 380 are opened for 2 seconds immediately after valve 202 is opened for one second, so as to replace the inside of the chamber with high-pressure $CO_2$ of 25 MPa. Thereafter, valves 190 and 380 are closed, and $CO_2$ is held in the chamber for 2 seconds. Then, the 20 tons press pressure transfers the pattern onto the mold 300. During pressing, extra $CO_2$ that remains in the spaces between the stamper 300 and the resist 200 is exhausted to the reserve space (not shown). This exhaustion maintains the pressure in the chamber, and realizes high-speed pressing. The instant embodiment sets the press time to 5 seconds. Thereafter, valves 180 and 380 are opened. Then the valve 170 is opened and the chamber is decompressed to harden the resist 200. The necessary decompression time is about 2 seconds. The substrate 100 is then taken out by moving up the piston 270.

As a result of an AFM (atomic force microscope) observation, the resist pattern groove 900 shown in FIG. 7 had a thickness of 10 nm at its bottom 700. Although it is preferable that the bottom 700 has a small thickness to shorten the removal time during oxygen plasma ashing in posttreatment, it is more preferable to control its thickness below 50 nm or 20 nm. According to this embodiment, a good pattern was confirmed as a result of observations of the inner, intermediate and outer circumferences of the resist 200 on which the pattern was transferred.

It took 20 seconds to process and remove one substrate 100. After one hundred substrates 100 were continuously pattern-transferred, only one stuck to the mold 300.

Posttreatment shown in FIG. 8 produced a patterned-media substrate as a magnetic recording medium based on the substrate 100 onto which the pattern was transferred by the imprint method of the second embodiment. As shown in FIGS. 8A and 8B, the pattern was formed by pressing the stamper 300 under compressed $CO_2$ against the resist film 200 (with a film thickness of about 100 nm) that had been formed on the substrate 100. Here, the pattern had a groove width of 100 nm and groove depth of 120 nm. The resist had a thickness of 10 nm at the groove bottom, as described above.

Figure 8A:
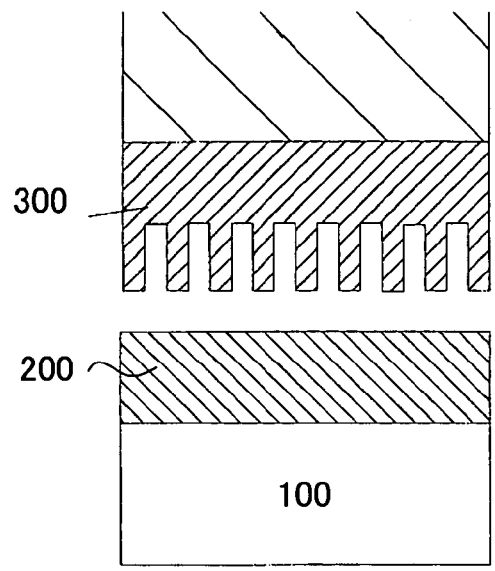
FIG. 8 is a schematic sectional view for explaining the way of manufacturing patterned media from a substrate in the posttreatment.
Figure 8B:
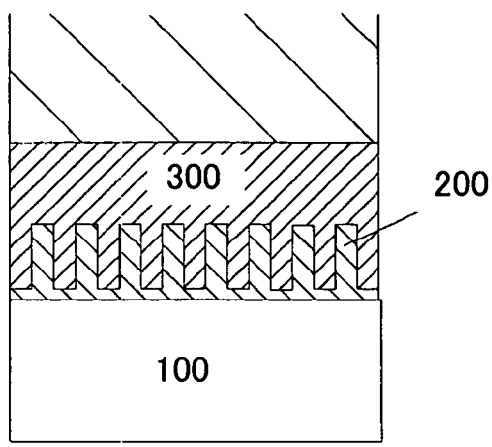
Figure 8C:
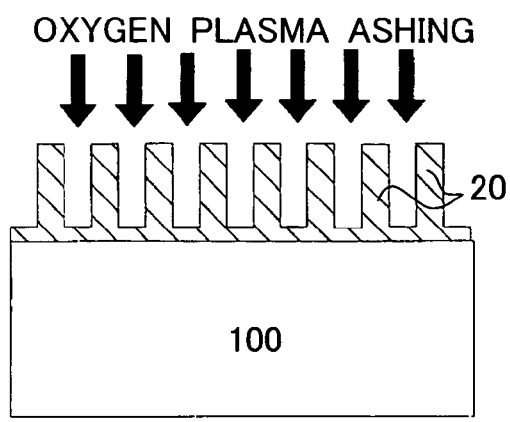
Figure 8D:
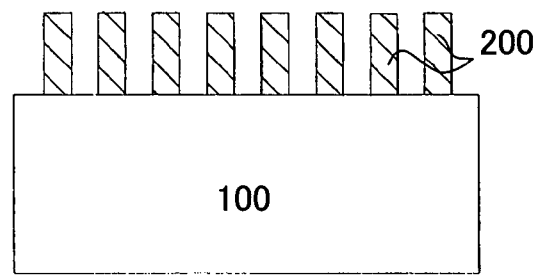

As shown in FIGS. 8C and 8D, oxygen plasma ashing to the substrate 100 that had formed the resist pattern using the mold 300, thinned the resist 200 down to a thickness of 20 nm, and exposed the substrate at the bottom of the resist pattern. Here, the ashing conditions were set at a projected power of 100 W, oxygen gas pressure of 1 Pa, and process time of 15 seconds.

Next, fluorocarbon gas, such as $C_2F_6$, replaced the gas and RIE etching of the glass substrate 100 reduced its depth down to 100 nm. Here, the etching condition was set at a projected power of 300 W, $C_2F_6$ gas pressure of 1 Pa, and process time of 90 seconds. Fluorocarbon gas usable for etching may include $CF_4$, $CHF_3$, etc. in addition to $C_2F_6$.

Figure 8E:
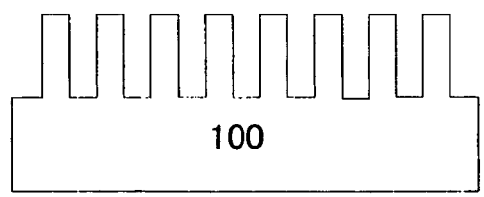
Figure 9A:
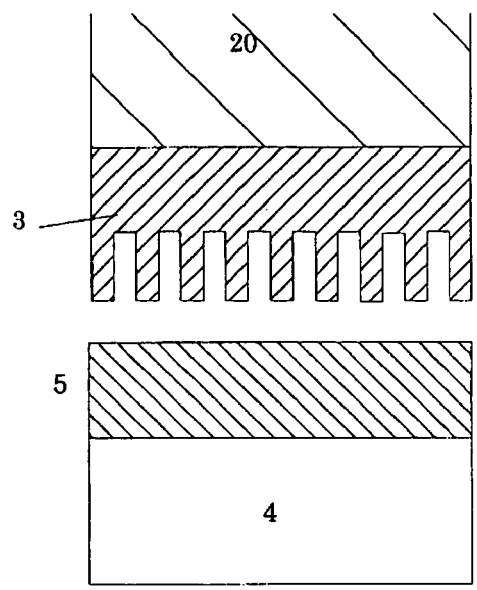
FIG. 9A-9E are is a schematic sectional view for explaining a conventional nanoimprinting method.
Figure 9B:
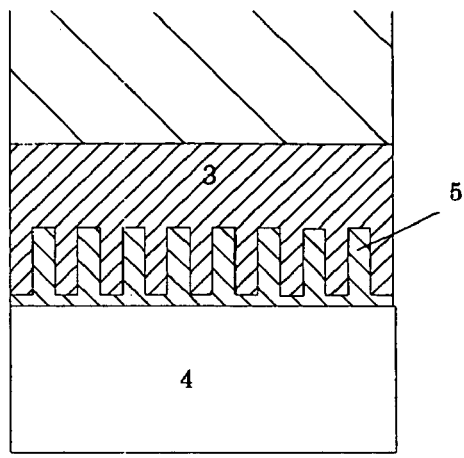
Figure 9C:
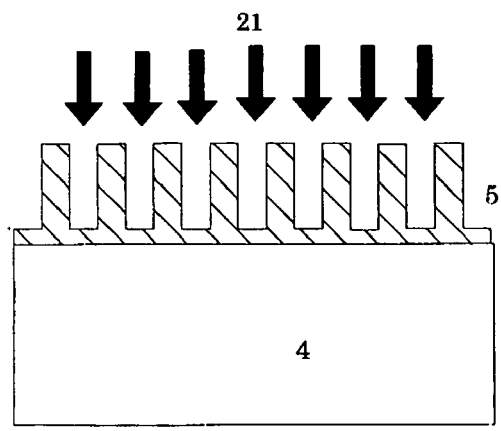
Figure 9D:
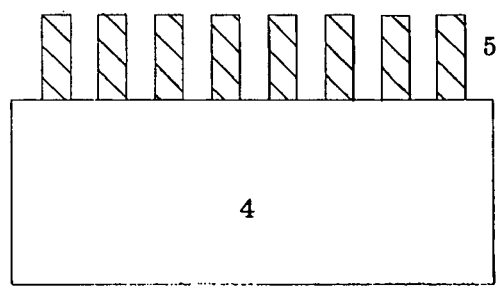
Figure 9E:
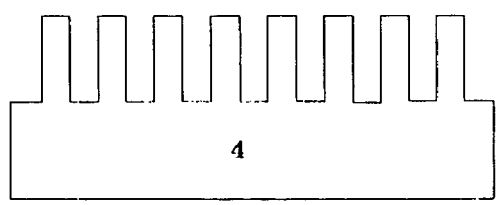

Next, gas was again replaced with oxygen from fluorocarbon gas so as to remove the remaining resist. As a result, the patterned substrate 100 was produced, as shown in FIG. 8E. The ashing condition at this time was set at a projected power of 100 W, an oxygen gas pressure of 1 Pa, and process time of 100 seconds. A magnetic thin film and a protective film formed by a known film formation process (not shown) completed the patterned media.

The thus-produced substrate 100 forms a magnetic film on the entire surface of its pattern. When a floating type magnetic head records and reproduces the patterned media that has been produced based on this substrate 100, the long distance between the pattern groove bottom and the magnetic head (or a large floating height of the magnetic head relative to the pattern groove bottom) sufficiently reduces the magnetic field from the magnetic head to the groove bottom. Thus, the crosstalk is reduced and the medium track becomes narrower since the magnetic head does not magnetize the groove bottom and the width at the land part between grooves restricts a recording marks.

One aspect of the present invention is that subsequent steps can apply conventional processes after the high-speed resist patterning with compressed $CO_2$. In other words, after forming a resist pattern as shown in FIG. 8D by the same method as the second embodiment, this embodiment when combined with the conventional processes subsequent to FIG. 11D would efficiently form the patterned media.

Third Embodiment

The imprint method similar to that of the first embodiment introduced silicon oil (with a molecular weight of 1000) as water repellency agent into the reserve tank 250, dissolved it in supercritical $CO_2$, and infiltrated it into the resist 200. The third embodiment improved release characteristics between the mold 300 and the resist 200, whereby the substrate 100 does not stick to the mold 300 and/or there was no transferring problem.

Further, the present invention is not limited to these preferred embodiments, and various variations and modifications may be made without departing from the scope of the present invention. For example, these embodiments used compressed $CO_2$ or supercritical $CO_2$, but the present invention does not limit the compressed gas or supercritical fluid to $CO_2$ and may use compressed He, supercritical He, or the like.

What is claimed is:

1. A nano-imprint method comprising the steps of:

softening a thin resin film that is made of poly (methyl methacrylate) and has a thickness of 50 μm or smaller, in an object to be processed, by infiltrating supercritical $CO_2$ into the thin resin film with a pressure between 10 and 30 MPa, the object including a substrate and the thin resin film applied onto the substrate;

transferring a nano-order pattern onto the thin resin film that has been softened, by pressing a mold that has the pattern against the thin resin film in the object, and a temperature of the object being made lower than a glass transition temperature of the thin resin film in said transferring step;

decompressing the supercritical $CO_2$ when the thin resin film is being soft after said transferring step, and hardening the thin resin film; and maintaining a temperature of the mold at a constant temperature equal to or lower than the glass transition temperature of the thin resin film in each of said softening, transferring and decompressing steps.

2. A nano-imprint method according to claim 1, further comprising the step of cleansing the resin thin film with the supercritical fluid after said transferring step.

3. A nano-imprint method according to claim 2, wherein said cleansing step maintains a pressure of the supercritical fluid between 7 MPa and 10 MPa.

4. A nano-imprint method according to claim 1, wherein said transferring step presses the mold with an effective pressure of 5 MPa or smaller.

5. A method for manufacturing a magnetic recording medium using a nano-imprint method, said nano-imprint method comprising the steps of:

softening a thin resin film that is made of poly (methyl methacrylate) and has a thickness of 50 μm or smaller, in an object to be processed, by infiltrating supercritical $CO_2$ into the thin resin film with a pressure between 10 and 30 MPa, the object including a substrate and the thin resin film applied onto the substrate;

transferring a nano-order pattern onto the thin resin film that has been softened, by pressing a mold that has the pattern against the thin resin film in the object, and a temperature of the object being made lower than a glass transition temperature of the thin resin film in said transferring step;

decompressing the supercritical $CO_2$ when the thin resin film is soft after said transferring step, and hardening the thin resin film; and maintaining a temperature of the mold at a constant temperature equal to or lower than the glass transition temperature of the thin resin film in each of said softening, transferring and decompressing steps.

6. A method according to claim 5, wherein the magnetic recording medium has, in a diameter range of 5 cm or larger, a spiral rectangular groove with a groove width of 50 nm to 150 nm, a groove depth of 30 nm to 100 nm, and a track pitch of 100 nm to 200 nm.

* * * * *